Aug. 18, 1936.   J. N. ICE   2,051,446

DRINKING GLASS

Filed Nov. 20, 1935

INVENTOR.
James N. Ice
BY
ATTORNEYS.

Patented Aug. 18, 1936

2,051,446

UNITED STATES PATENT OFFICE 2,051,446

DRINKING GLASS

James N. Ice, Wheeling, W. Va., assignor, by mesne assignments, to Wace Development Corporation, Wheeling, W. Va., a corporation of West Virginia Application November 20, 1935, Serial No. 50,767

1 Claim. (Cl. 65—66)

This invention is directed to an improvement in drinking glasses of the type designed to receive a beverage and used in the ordinary conventional manner for drinking purposes.

In connection with drinking glasses of this type for certain beverages, for example beer, the ordinary glass suffers under certain disadvantages which detract materially from its desired function. For example, beer is delivered to the glass at a temperature considerably lower than that of the atmosphere, and as the glass is, in the majority of cases, at atmospheric temperature, there is a moisture accumulation or sweating on the exterior of the glass, and furthermore, owing to the rather rapid heat transference through the glass wall, the beer rapidly approaches atmospheric temperature and soon becomes flat.

The present invention is designed with a view to providing a drinking glass which will materially overcome the disadvantages noted and at the same time present other advantages not possible in the conventional drinking glass, and with this end in view the improved drinking glass comprises two glasses, one within the other, the external diameter of the upper end of the inner glass very closely approaching the internal diameter of the upper end of the outer glass, with these diameters so related that when the inner glass is fitted within the outer glass there is a slight margin at the upper end of the inner glass projecting above the upper edge of the outer glass. The inner glass is more convergent downwardly than the outer glass, so that when the glasses are arranged relative to each other, there is an appreciable air space between the glasses. The upper edges of the glasses are then subjected to annealing and then to a welding heat which will cause the projecting edge of the inner glass to be rolled over and welded to the upper edge of the outer glass, forming a beaded edge, insuring an absolute non-leaking juncture between the glasses and presenting a smooth, rounded and relatively thin drinking edge.

A further object of the invention is the provision of a drinking glass of this type in which the insulating air space between the inner and outer glass is maintained of substantially constant transverse dimensions throughout the length of the completed glass. To this end, the upper end of the inner glass is given a considerable flare so that it is fitted within the outer glass to leave an upper projecting margin of the inner glass to complete the junction of the glasses in the welding or like operation. Through the extent of this flare, the inner and outer glasses may be made on the same form, differing only in diameter, so that the sides of the respective glasses extend in substantial parallelism from a point immediately adjacent the upper or free edge of the completed glass throughout the length of the inner glass.

The invention is illustrated in the accompanying drawing, in which.

Figure 1:
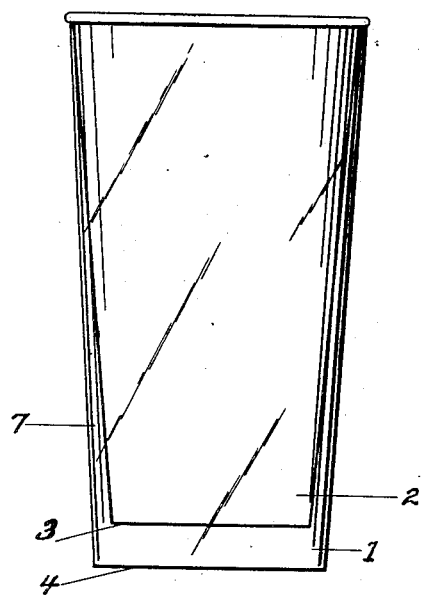
Figure 1 is a view in elevation showing the completed glass of one form.
Figure 2:
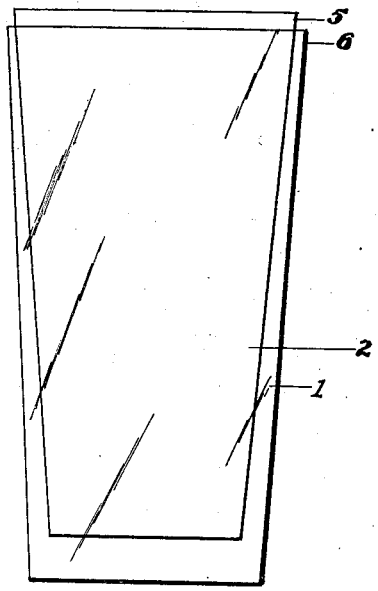
Figure 2 is a similar view showing the assembled glasses of this form prior to the welding operation.
Figure 3:
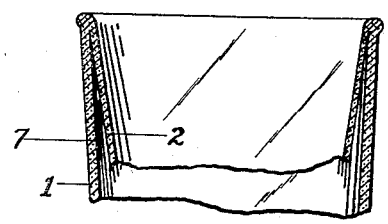
Figure 3 is a broken vertical section through the completed glass of the form shown in Figure 1.

In making up the improved glass, an ordinary drinking glass 1 is provided to form the outer glass and a more or less conventional second drinking glass 2 is provided to form the inner glass. The inner glass is preferably, though not necessarily, of less thickness than the outer glass, is of somewhat less height than the outer glass, and the wall of the inner glass is more convergent downwardly than the wall of the outer glass.

The relative heights of the glasses are such and the relative diameters of the upper ends have such relation that when the inner glass 2 is fitted within the outer glass 1, the bottoms of the respective glasses, indicated at 3 and 4, will be spaced apart, and the inner glass will present a slight margin 5 at the upper edge above the upper edge 6 of the outer glass.

As thus arranged and owing to the relatively different slope of the inner and outer glasses, there will be an air space 7 between the inner and outer glasses, the transverse area of which increases downwardly from the upper edges of the glasses.

With the glasses thus arranged, the upper edges are subjected to an annealing step and then to a welding heat, causing the projecting edge 5 of the inner glass to flow down over and weld to the upper edge 6 of the outer glass. This produces a smooth, rounded, relatively thin, beaded upper edge of the composite glass for drinking purposes which absolutely and positively seals the air space between the glasses.

During this welding operation, the air in the air space between the glasses becomes highly heated and expanded, and a portion of such air will naturally be forced out between the interfitting edges of the glasses prior to the completion of the welding operation. As the glasses cool down to atmospheric temperature, there will of course be some rarefaction of the air in the air space between the glasses, tending obviously to a better heat insulating area.

Owing to the insulating properties, the contained beverage, such as beer for example, will require a much longer time to reach the temperature of the atmosphere than in an ordinary glass, and further, the difference between the temperature of the glass and that of the beverage will induce no moisture or sweating on the outer surface of the outer glass.

The invention lends itself to another advantage which, while possessed by an ordinary drinking glass, is very much more economically carried out in the present invention. The authorities require effective sterilization of all glasses for public use, particularly in serving beer, and experience has demonstrated that machine-made glasses will not stand up under required sterilization. If, as is almost universally the case, the glasses are to be marked with the name of the distributor or of the hotel or other place of business using the glasses, such marking, in order to be permanent, has to be cut into hand-made glasses, and adds materially to the expense. With the present invention, such data can be placed inexpensively on the outer surface of the inner glass 2, and remain during the life of the glass as it is not subjected to any influence tending to remove it. Furthermore, the use of the two independent glasses arranged in the manner described tends to a magnifying effect on the contents when viewed through the outer glass, and this materially improves the appearance of the beverage.

The improved glass in effect is the provision of two independent hand-made glasses fitted one within the other, with their upper edges in close contact and providing an air space between them, with the extreme upper edge of the inner glass projecting slightly above the upper edge of the outer glass and with this projecting edge of the inner glass, as well as the upper edge of the outer glass, united by a welding operation which rolls the projecting upper edge of the inner glass onto the upper edge of the outer glass in a smooth, rounded, relatively thin drinking edge.

Figure 4:
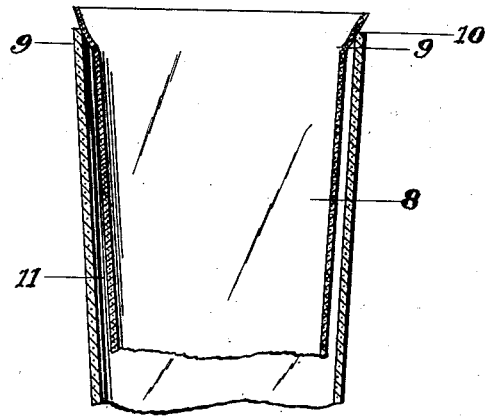
Figure 4 is a broken vertical sectional view showing a modified form of glass in which the walls of the inner and outer glasses are maintained in substantial parallelism.

The invention also contemplates the construction of the drinking glass so that the inner glass is spaced throughout from the outer glass with a substantially uniform spacing. This form is illustrated particularly in Figures 4 and 5. In providing for this result, the upper end of the inner glass is flared to overlie and rest upon the outer glass, with the flare of sufficient diameter to space the extreme upper portion of the inner glass from the outer glass commensurate with the uniform spacing. This construction is illustrated in Figure 4 of the drawing wherein the inner glass, indicated at 8, is outwardly flared at the upper end, as at 9, with the free edge of the flared portion resting upon and projecting slightly above the upper edge of the outer glass 10. The lateral extent of the flare is sufficient to maintain the upper portion of the inner glass 10 spaced from the outer glass to an appreciable degree and this spacing 11 is maintained substantially uniformly throughout the length of the inner glass.

Figure 5:
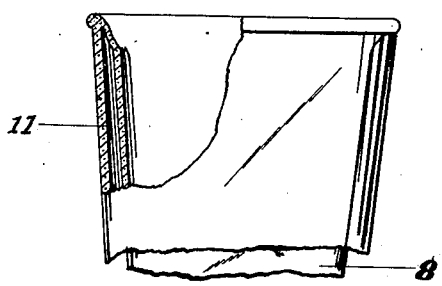
Figure 5 is a broken elevation, partly broken out, showing the completed glass of the form illustrated in Figure 4.

Thus, in the form illustrated in Figures 4 and 5, the inner and outer glasses are spaced apart through a uniform spacing throughout the length of the inner glass; that is, the walls of the inner and outer glasses are substantially in parallelism. Obviously, through the flare indicated at 9, the degree of spacing between the inner and outer glasses may be controlled as desired and thus the glasses may be arranged with any degree of spacing, in accordance with the purpose for which the glasses are primarily designed. The upper edge of the flare 9 projecting above the free upper edge of the outer glass is, of course, welded onto such free upper edge, as indicated in Figure 5, and as described in connection with the first form.

It is, of course, to be understood that the invention is designed with a view to taking advantage of the glass making art, under which circumstances the drinking glass of the present invention may be formed as a unit by a well known glass making process, the bottoms of the inner and outer glasses being later applied by a well understood hot process to complete the article.

While shown as applied to a drinking glass, the same principle may be readily applied to other glass articles, as for example punch bowls, water pitchers, cracked ice or cubed ice containers, soup bowls and the like, and furthermore, it is to be distinctly understood that the invention contemplates the use of different colored glass in the respective parts, for example, a plain outer glass and a colored inner glass or an outer glass of a pale color and an inner glass of a deeper color, with either or both glasses plain or ornamented as may be desired.

What is claimed to be new is:

A drinking glass formed of two independent drinking glasses, each complete in itself, arranged one within the other to provide an uninterrupted intervening air space, the extreme upper edges of the independent glasses integrally merging into a beaded drinking edge, said beaded edge serving as the sole sealing element between the glasses, the upper end of the wall of the inner glass flaring outwardly into coincidence with the beaded edge, the similar walls of the glasses being otherwise substantially parallel.

JAMES N. ICE.